July 24, 1962      J. P. FAY      3,045,688
FIRST STAGE REGULATOR
Filed April 10, 1961
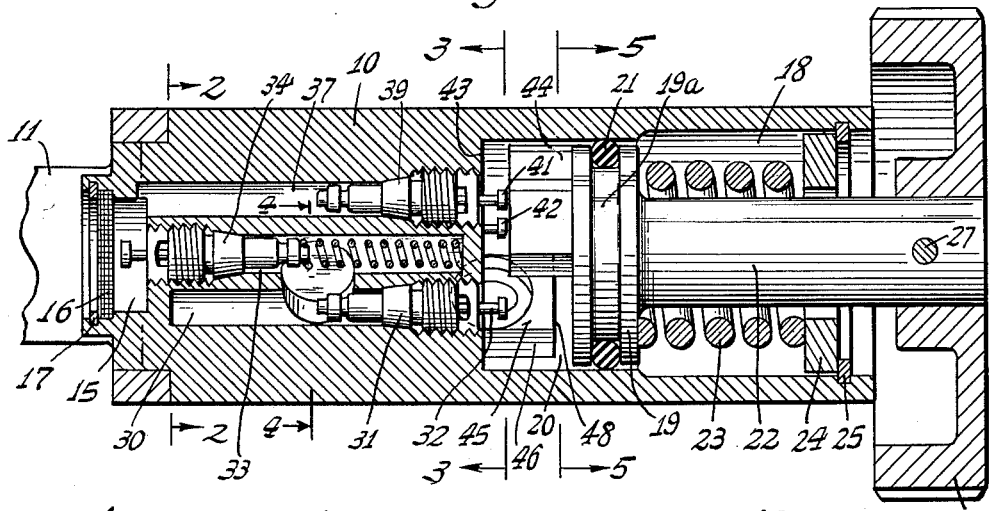
INVENTOR.
James P. Fay
BY
Johnson and Kline
ATTORNEYS

United States Patent Office 3,045,688
Patented July 24, 1962

3,045,688
FIRST STAGE REGULATOR
James P. Fay, 18 France St., Norwalk, Conn.
Filed Apr. 10, 1961, Ser. No. 101,884
11 Claims. (Cl. 137—63)

This invention relates to a regulator for breathable gases and more particulardly to a first stage regulator having a built-in reserve for use in a single hose diving device.

It is an object of the invention to provide a first stage regulator which is simple in construction, easy and reliable in operation, and which can be readily assembled and, if desired, disassembled for checking and replacing the component parts thereof.

It is another object of the invention to provide a first stage regulator with a built-in reserve which is safe and accurate and which can be readily operated by the user.

Other features and advantages of the invention will be apparent from the specification and claims when considered in connection with the accompanying drawings in which:

FIGURE 1 is a longitudinal sectional view of the device taken along lines 1—1 of FIG. 2.

FIG. 2 is a sectional view of the device taken along lines 2—2 of FIG. 1.

FIG. 3 is a sectional view taken along lines 3—3 of FIG. 1.

FIG. 4 is a fragmentary sectional view taken along lines 4—4 of FIG. 1.

FIG. 5 is a sectional view taken along lines 5—5 of FIG. 1.

FIG. 6 is a side view of the device in position on the neck of a tank.

As is shown in the drawings, the first stage regulator comprises an elongate body or housing 10 having a yoke 11 secured thereto at one end adapted to be slipped over a neck 12 of a tank of compressed air or the like breathable gas 13 and to be clamped in place thereby by a screw 14 threaded in the yoke which presses the neck of the tank against the adjacent end of a housing. The neck of the tank has the usual opening (not shown) for communicating with an input chamber 15 formed in the end of the housing. If desired, the input chamber can be provided with a microporous filter 16 extending thereover and held in place by a usual snap ring 17 or the like. The other end of the housing is provided with a bore 18 forming a cylinder having a piston 19 movable therein to form an expansible chamber 20 at the inner end of the bore, the piston having a resilient O-ring 21 thereon mounted in groove 19a for sealing the chamber and a piston rod 22 extending rearwardly therefrom through the other end of the housing. A spring 23 is disposed around the piston rod and has one end engaging the back of the piston and the other end abutting a washer 24 disposed in the end of the bore and locked in place by a spring washer 25. The spring urges the piston in the direction of the opposite wall of the expansible chamber. A handwheel 26 for rotating the piston in the bore is secured to the end of the piston rod by a removable pin 27 or the like securing means.

The expansible chamber is provided with a fitting 28 to which a hose 29 of a single hose diving device (not shown) is connected so that the expansible chamber is responsive to the removal of air therefrom by inhalation from the diving device.

As shown in FIG. 1, the input chamber is connected to the expansible chamber by a plurality of passages forming the normal and reserve passages of the regulator. The normal operating passage comprises a first passage 30 extending into the body from the expansible chamber and having a valve 31 provided with an actuator 32 projecting into the expansible chamber and a second passage 33 extending into the body from the input chamber and having a spring controlled, pressure controlled valve 34 therein. The passages 30 and 33 are located adjacent one another and are connected by a transverse bore 35 as shown in FIG. 4. The bore 35 is closed by a plug 36 threaded therein. The pressure controlled valve in the normal operating passage is normally closed, but is opened by the flow of gas in the passage due to the pressure differential between the input and expansible chambers. When the pressure differential between the input chamber and the expansible chamber falls below a predetermined value, the flow of air through the normal operating passage is prevented.

The housing has at least one reserve passage extending from the output chamber directly from the input chamber. In the illustrated form of the invention, I have provided two such passages 37, 38 each having a valve 39, 40 therein provided with an actuator 41, 42 projecting into the expansible chamber for controlling the passage of air therethrough in order to insure an adequate supply of air during the reserve operation of the regulator.

As noted in FIGS. 1 and 3, the valve actuators for the normal and reserve control valves are located in the wall 43 of the expansible chamber opposite the piston and are disposed at opposite sides of the chamber so as to be readily selectively operated. In order to selectively operate the valve actuators for controlling the flow of breathable gas to the expansible chamber, the piston has on its face a valve operator 44 of a size to be positioned to selectively engage the actuating members of the valves to control the passage of air from the normal operating or reserve passages. The positioning of the operator is accomplished by rotating the piston by means of the handwheel 26. The housing has a stop 45 thereon, located in the expansible chamber and having a shoulder 46 for engaging the operator when the piston is rotated in one direction to locate the valve operator above the actuator member 32 for the normal passage when the piston moves toward the valve actuator in response to decrease of pressure in the expansible chamber as it is withdrawn by the user. When the operator engages the actuator for the valve, air from the supply is fed into the expansible chamber to restore the pressure therein and lift the piston and operator thereon out of engagement with the valve actuator 32. When the pressure at the supply falls to a predetermined value such that the differential of pressure between the source and the expansible chamber is less than a predetermined amount and passage of air will be stopped by the valve 34 and no air will pass into the expansible chamber, it will give the user notice that it is time to turn to the reserve supply. The user then rotates the piston by means of a handwheel 26 to the dot-and-dash position in FIG. 3 in which the operator engages the other shoulder 47 on the stop 45 in which position the operator is disposed in operative relationship with the actuators 41, 42 for the valves in the reserve passages and operation of the piston will cause the valves to be actuated and supply the reserve air to the inhalation chamber.

Preferably, the stop 45 is provided with an upper surface 48 for engaging the piston and preventing the piston from moving toward the opposite wall to such a position in which it might damage the valve actuators.

To facilitate the movement of the operator between normal and reserve positions without damaging the actuators projecting into the expansible chamber, the body is provided with a cam 49 cooperating with the opertor so that as the piston is rotated it retracts the operator out of contact with the actuating members for the valves and maintains the operator in raised position until it is moved over the actuators for other valves where it is permitted to descend directly upon the valve actuators without applying lateral pressure thereto as might bend them or damage them.

In the event the pressure in the expansible chamber becomes excessive, the regulator of the present invention provides a safety device in the form of pressure release means. This means is formed by enlarging the outer end of the bore 18, as shown in FIG. 1, so that when there is excess pressure in the expansible chamber it will push the piston back into the enlarged bore and permit the gas to by-pass the piston and escape from the end of the housing.

The regulator of the present invention while intended to be used with the usual tank of breathable gas can also be used with a source of supply, such as a compressor or the like mounted in a boat and connected thereto by a hose. This is accomplished by removing the plug 36 from the connecting bore and by connecting a hose having a nipple (not shown) to the bore. Also, if desired, a suitable pressure gauge (not shown) can be threaded into the bore 35 when the plug is removed for the purpose of testing the regulator.

The regulator of the present invention is simple in construction, involving but a few parts which can be readily assembled. The valves employed can be standard Schrader or Dill valves which can be quickly threaded into place. When it is desired to disassemble the regulator, it is merely necessary to remove the snap rings 17 and 25 after which the filter and piston assembly can be removed from the housing exposing the valves for inspection or replacement.

Variations and modifications may be made within the scope of the claims and portions of the improvements may be used without others.

I claim:

1. In a regulator, a housing having an input chamber adapted to be connected to a source of breathable gas under pressure and an expansible chamber having an outlet adapted to be connected to an inhalation hose; normal and reserve passages connecting said input chamber and said expansible chamber, said normal passage having a pressure responsive check valve and each of said passages having a valve provided with an actuator exposed in said expansible chamber, said expansible chamber having a movable wall provided with a valve operator portion adapted to be positioned to selectively engage the actuators for the valves; means normally urging the operator portion into valve-engaging position when pressure in the expansible chamber falls below a predetermined value; and manually operable means for moving the valve operator portion into a selected position to engage the desired actuator for the proper valve.

2. In a regulator, a housing having an input chamber adapted to be connected to a source of breathable gas under pressure and an expansible chamber having an outlet adapted to be connected to an inhalation hose; normal and reserve passages connecting said input chamber and said expansible chamber, said normal passage having a pressure responsive check valve and each of said passages having a valve provided with an actuator exposed in said expansible chamber, said expansible chamber having a movable wall provided with a valve operator portion adapted to be positioned to selectively engage the actuators for the valves; means normally urging the operator portion into valve-engaging position when pressure in the expansible chamber falls below a predetermined value; manually operable means for moving the valve operator portion into a selected position to engage the desired actuator for the proper valve; and stop means for limiting the movement of the movable wall in the direction of the actuators whereby undue pressure on the actuators is prevented.

3. In a regulator, a housing having an input chamber adapted to be connected to a source of breathable gas under pressure and an expansible chamber having an outlet adapted to be connected to an inhalation hose; normal and reserve passages connecting said input chamber and said expansible chamber, said normal passage having a pressure responsive check valve and each of said passages having a valve provided with an actuator exposed in said expansible chamber, said expansible chamber having a movable wall provided with a projecting operator thereon adapted to be positioned to selectively engage the actuators for the valves; means normally urging the operator portion into valve-engaging position when pressure in the expansible chamber falls below a predetermined value; manually rotatable means for moving the valve operator; and stop means for locating the operator portion in a selected position to engage the desired actuator for the proper valve.

4. In a regulator, a housing having an input chamber adapted to be connected to a source of breathable gas under pressure and an expansible chamber having an outlet adapted to be connected to an inhalation hose; normal and reserve passages connecting said input chamber and said expansible chamber, said normal passage having a pressure responsive check valve and each of said passages having a valve provided with an actuator exposed in said expansible chamber, said expansible chamber having a movable wall provided with a projecting operator thereon adapted to be positioned to selectively engage the actuators for the valves; means normally urging the operator into valve-engaging position when pressure in the expansible chamber falls below a predetermined value; manually operable means for moving the valve operator into a selected position to engage the desired actuator for the proper valve; and means operable incident to the movement of the valve operator between selected positions for moving the operating portion to a retracted position out of engagement with the actuators whereby lateral pressure on the actuators is prevented.

5. In a regulator, a housing having an input chamber adapted to be connected to a source of breathable gas under pressure and a cylinder having a piston movable therein to form an expansible chamber adapted to be connected to an inhalation hose; a plurality of passages extending from the input chamber to the wall of the expansible chamber opposite said piston, each passage having a valve provided with an actuator projecting into the expansible chamber, one passage forming the normal operating passage having means therein preventing flow of gas therethrough when the pressure differential between the source and the expansible chamber is below a predetermined value, said piston having a valve operator projecting therefrom adapted to be positioned to selectively engage the desired valve actuators; means normally urging the piston to valve engaging position; and means for rotating said piston for positioning the operator to engage the proper actuator when pressure in the expansible chamber is below said predetermined value.

6. In a regulator, a housing having an input chamber adapted to be connected to a source of breathable gas under pressure and a cylinder having a piston movable therein to form an expansible chamber adapted to be connected to an inhalation hose; a plurality of passages extending from the input chamber to the wall of the expansible chamber opposite said piston, each passage having a valve provided with an actuator projecting into the expansible chamber, one passage forming the normal operating passage having means therein preventing flow of gas therethrough when the pressure differential between the source and the expansible chamber is below a predetermined value, said piston having a valve operator projecting therefrom adapted to be positioned to selectively engage the desired valve actuators; means normally urging the piston to valve engaging position; means for rotating said piston; and stop means on the housing cooperating with the piston for positioning the operator to engage the proper actuator when pressure in the expansible chamber is below said predetermined value.

7. In a regulator, a housing having an input chamber adapted to be connected to a source of breathable gas under pressure and a cylinder having a piston movable therein to form an expansible chamber adapted to be connected to an inhalation hose; a plurality of passages extending from the input chamber to the wall of the expansible chamber opposite said piston, each passage having a valve provided with an actuator projecting into the expansible chamber, one passage forming the normal operating passage having means therein preventing flow of gas therethrough when the pressure differential between the source and the expansible chamber is below a predetermined value, said piston having a valve operator projecting therefrom adapted to be positioned to selectively engage the desired valve actuators; means normally urging the piston to valve engaging position; means for rotating said piston; and stop means on the housing cooperating with the piston for positioning the operator to engage the proper actuator and for preventing undue pressure of the operator on the actuator when pressure in the expansible chamber is below said predetermined value.

8. In a regulator, a housing having an input chamber adapted to be connected to a source of breathable gas under pressure and a cylinder having a piston movable therein to form an expansible chamber adapted to be connected to an inhalation hose; a plurality of passages extending from the input chamber to the wall of the expansible chamber opposite said piston, each passage having a valve provided with an actuator projecting into the expansible chamber, one passage forming the normal operating passage having means therein preventing flow of gas therethrough when the pressure differential between the source and the expansible chamber is below a predetermined value, said piston having a valve operator projecting therefrom adapted to be positioned to selectively engage the desired valve actuators; means normally urging the piston to valve engaging position; means for rotating said piston for positioning the operator to engage the proper actuator when pressure in the expansible chamber is below said predetermined value; and means operable during rotation of the piston for moving the piston to a retracted position wherein the operator is held clear of engagement with the actuators during said rotation whereby lateral pressure and damage of the actuators is prevented.

9. In a regulator, a housing having an input chamber adapted to be connected to a source of breathable gas under pressure and a cylinder having a piston movable therein to form an expansible chamber adapted to be connected to an inhalation hose; a pair of passages extending from the input chamber and opening in the wall of the expansible chamber opposite said piston, one passage forming the reserve supply directly connecting said chambers and the other passage forming the normal supply and having means therein for preventing flow therethrough when the pressure differential between said chambers is below a predetermined value; control valves in each passage having an actuator projecting into the expansible chamber, said piston having a valve operator projecting from the face thereof; means urging the piston to valve-actuating position when the pressure in the expansible chamber falls below a predetermined value; and manually operable means for rotating said piston to cause the valve operator to selectively engage the valve controlling the normal and reserve supplies.

10. In a regulator, a housing having an input chamber adapted to be connected to a source of breathable gas under pressure and a cylinder having a piston movable therein to form an expansible chamber adapted to be connected to an inhalation hose; a pair of passages extending from the input chamber and opening in the wall of the expansible chamber opposite said piston, one passage forming the reserve supply directly connecting said chambers and the other passage forming the normal supply and having means therein for preventing flow therethrough when the pressure differential between said chambers is below a predetermined value; control valves in each passage having an actuator projecting into the expansible chamber, said piston having a valve operator projecting from the face thereof; means urging the piston to valve-actuating position when the pressure in the expansible chamber falls below a predetermined value; manually operable means for rotating said piston to cause the valve operator to selectively engage the valve controlling the normal and reserve supplies; and means for retracting the operator on the piston from actuator engaging position incident to the rotation of the piston whereby lateral pressure on the actuator by the operator during said rotation is avoided.

11. The invention as described in claim 5, wherein the normal operating passage comprises a passage opening to the input chamber, a juxtaposed passage opening to the expansible chamber and a transverse bore in the housing extending from one side thereof with the inner end intersecting said passages, said bore being closed at the outer end by a threaded plug.

References Cited in the file of this patent
UNITED STATES PATENTS
2,939,471    Fay _____ June 7, 1960
FOREIGN PATENTS
1,203,984    France _____ Aug. 3, 1959

UNITED STATES PATENT OFFICE

CERTIFICATE OF CORRECTION

Patent No. 3,045,688                                                                       July 24, 1962

James P. Fay

It is hereby certified that error appears in the above numbered patent requiring correction and that the said Letters Patent should read as corrected below.

Column 1, line 8, for "particulardly" read -- particularly --; column 2, line 67, for "opertor" read -- operator --; column 3, line 52, for "value" read -- valve --.

Signed and sealed this 13th day of November 1962.

(SEAL)
Attest:

ERNEST W. SWIDER                                         DAVID L. LADD
Attesting Officer                                            Commissioner of Patents